United States Patent
Jackson et al.

(10) Patent No.: US 6,712,726 B1
(45) Date of Patent: Mar. 30, 2004

(54) LUBE REGULATED PRESSURE REGULATOR VALVE

(75) Inventors: Scott C. Jackson, Chester, VT (US); Robert C. Warnke, Spooner, WI (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/263,046

(22) Filed: Oct. 1, 2002

Related U.S. Application Data

(60) Provisional application No. 60/327,859, filed on Oct. 5, 2001.

(51) Int. Cl.[7] .......................... F16H 31/00; F16H 13/00
(52) U.S. Cl. ..................................... 475/127; 137/512.3
(58) Field of Search ................................ 475/118, 120, 475/127; 477/156, 158; 137/512.3, 601.2

(56) References Cited

U.S. PATENT DOCUMENTS

| | | | |
|---|---|---|---|
| 3,508,583 A | 4/1970 | Kaptur | |
| 3,541,893 A | 11/1970 | Dyke et al. | |
| 3,949,847 A | 4/1976 | Hoehn | |
| 4,027,474 A | * 6/1977 | Demase ................... | 60/39.281 |
| 4,051,932 A | 10/1977 | Arai et al. | |
| 4,478,105 A | 10/1984 | Yamamuro et al. | |
| 4,618,036 A | 10/1986 | Ideta | |
| 4,724,727 A | * 2/1988 | Shibayama et al. ........ | 475/128 |
| 5,234,092 A | 8/1993 | Mahoney ................. | 192/87.13 |
| 5,251,734 A | 10/1993 | Benford et al. | |
| 5,465,937 A | 11/1995 | Nokubo et al. ........ | 251/129.15 |
| 5,513,732 A | 5/1996 | Goates | |
| 5,611,371 A | 3/1997 | Wirtz | |
| 5,722,459 A | 3/1998 | Kim et al. | |
| 5,931,179 A | 8/1999 | Megerle et al. ............... | 137/15 |
| 5,997,437 A | 12/1999 | Jang | |
| 6,485,388 B2 | * 11/2002 | Kim et al. .................. | 475/127 |
| 6,543,472 B2 | 4/2003 | Stafford ................... | 137/454.2 |

OTHER PUBLICATIONS

U.S. patent application Ser. No. 10/035,260, Stafford filed Jan. 2002.

* cited by examiner

*Primary Examiner*—Roger Pang
(74) *Attorney, Agent, or Firm*—Clifford F. Rey

(57) ABSTRACT

A Lube Regulated Pressure Regulator Valve including an internal check valve that passes transmission fluid from the hydraulic pump in an amount sufficient to fill the torque converter in the Park gear range and at low engine speeds is disclosed. The internal check valve opens at a substantially lower line pressure than is required to open the original equipment manufacture pressure regulator valve to ensure the torque converter is operational at engine startup. As engine speed increases and sufficient line pressure builds up within the torque converter charge circuit, the internal check valve is closed and the pressure regulator valve opens as it would normally to feed line pressure to the torque converter directly. When the engine is shut off, the internal check valve is biased to a closed position preventing automatic transmission fluid from draining back from the torque converter through the pressure regulator valve to the fluid sump.

20 Claims, 5 Drawing Sheets

LUBE REGULATED PRESSURE REGULATOR VALVE

CROSS-REFERENCE TO RELATED APPLICATION

This application claims the benefit under 35 U.S.C. §119 (e) of U.S. Provisional Patent application No. 60/327,859 filed Oct. 5, 2001 entitled Lube Regulated Pressure Regulator Valve.

BACKGROUND OF INVENTION

The present invention relates to automatic transmission systems and, more particularly to an improved pressure regulator valve for Chrysler A518, 46RA, 46RE, A500, 40RH, 42RE, and 42RH transmission (hereinafter "Chrylster transmissions").

Automatic transmission systems of the prior art have a hydraulic circuit subsystem which includes at least a hydraulic pump, a valve body having fluid conducting passages or circuits, input and exhaust ports formed within the fluid circuits, and a plurality of spool valves so-called because of their resemblance to sewing thread type spools. Such valves are comprised of cylindrical pistons having control diameters or lands formed thereon, which alternately open and close the ports to regulate the flow and pressure of automatic transmission fluid (hereinafter "ATF") within the fluid circuits to actuate various components of the transmission. It will be understood that in describing hydraulic fluid circuits, ATF usually changes names when it passes through an orifice or control valve in a specific circuit.

Pumps in automatic transmission systems are generally positive displacement pumps driven by the engine of the vehicle wherein the transmission is installed. A positive displacement pump is one, which has the same output per revolution regardless of pump speed or pressure already developed in the system. Thus, it is necessary to regulate ATF pressure so it does not get too high and damage other components. A basic pressure regulator valve employs a piston and a spring that compresses at a specific pressure to allow some ATF to flow back to the pump reservoir or sump bypassing the hydraulic circuit and reducing pressure. By using a pressure regulator valve with a compression spring calibrated to a pressure lower than the pump's output, a constant ATF pressure can be maintained in the system during operation.

When the engine of the vehicle is turned off, ATF contained within the torque converter during operation gradually drains back to the fluid sump. At initial engine start-up this can result in an insufficient fluid level in the torque converter to operate the vehicle. Further, the original equipment manufacture (hereinafter "OEM") pressure regulator valve does not send sufficient line pressure from the pump output circuit into the torque converter charge circuit in the Park gear range or at idle speed to refill the torque converter to permit instant operation of the vehicle with engine start-up.

Thus, the present invention has been developed to resolve this problem and other shortcomings of the prior art.

SUMMARY OF THE INVENTION

Accordingly, the present invention is a Lube Regulated Pressure Regulator Valve including an internal check valve that opens in the Park gear range and at low engine speeds to pass line pressure to the torque converter in response to a substantially lower hydraulic fluid pressure than is required to open the pressure regulator valve in its factory specified operating range. As engine speed increases and sufficient line pressure is built up within the torque converter charge circuit, the internal check valve is again closed and the pressure regulator valve opens as it would normally to feed line pressure to the torque converter directly. When the engine is shut off, the internal check valve is biased to a closed position preventing ATF from draining back through the valve to the fluid sump eliminating the aforementioned converter drain back problem.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
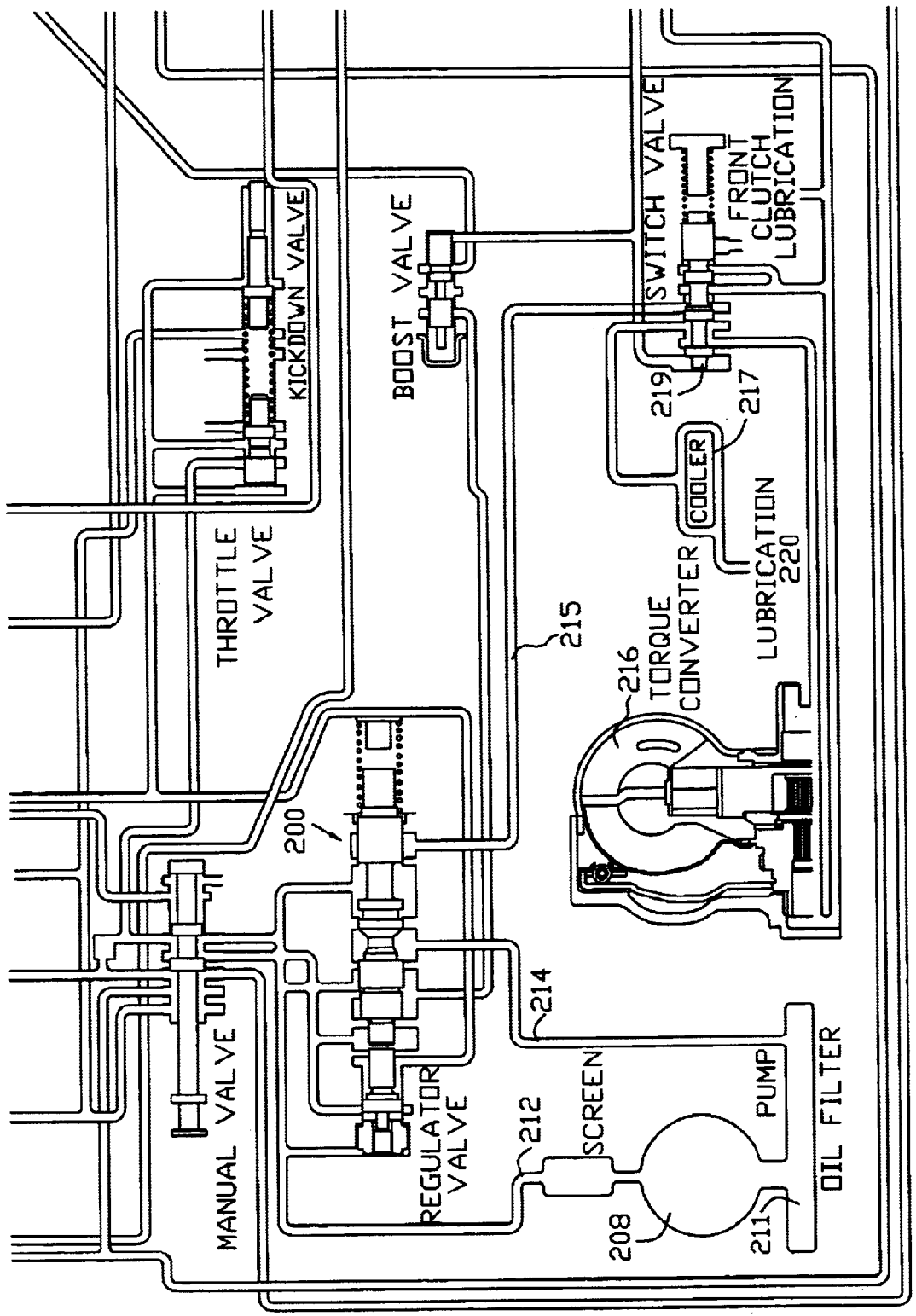
FIG. 1 is a partial schematic drawing of the hydraulic system in pertinent part, of the Chrysler transmission showing the location and hydraulic circuits associated with the Pressure Regulator Valve.

Prior to describing the present invention in detail it may be beneficial to review the function of a pressure regulator valve within the hydraulic system of the automatic transmission. Referring to FIG. 1 there is shown a schematic view of the relevant portion of the hydraulic system of the aforementioned Chrysler transmissions wherein the OEM pressure regulator valve, indicated generally at 200, is illustrated.

Figure 2A:
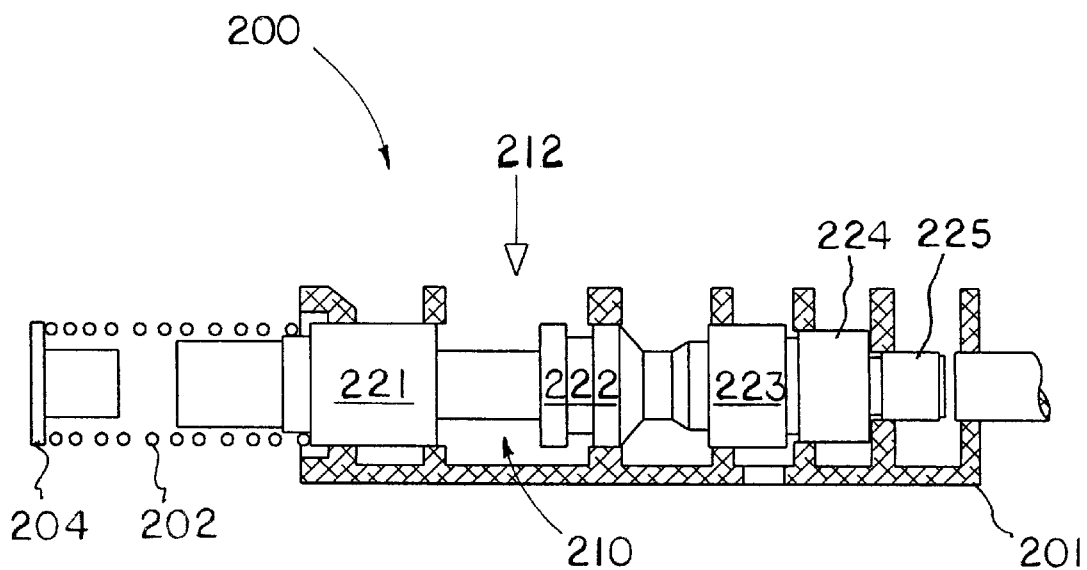
FIG. 2A is a diagrammatic view of an OEM Pressure Regulator valve labeled Prior Art and shown in a closed position within the valve body.
Figure 2B:
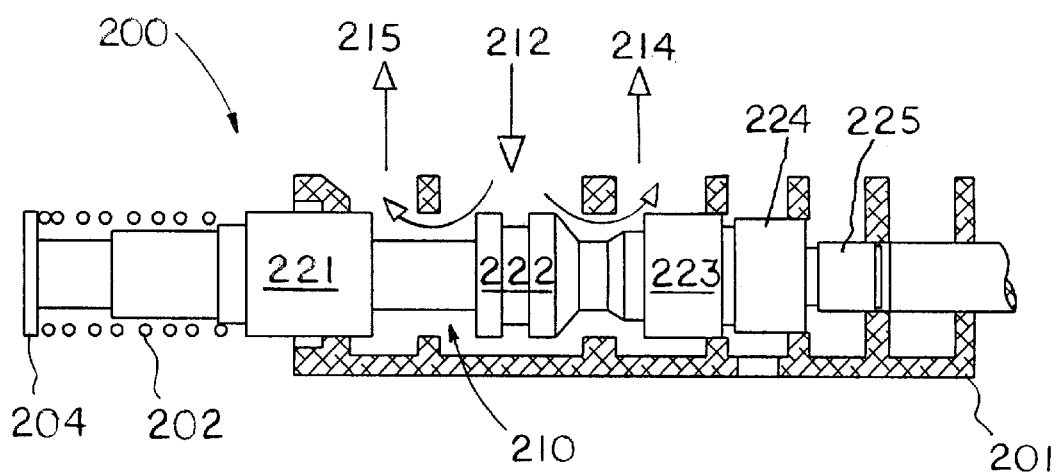
FIG. 2B is a diagrammatic view of the OEM pressure regulator valve of FIG. 2A labeled Prior Art and shown in an open position.

The pressure regulator valve 200 is located in the valve body 201 of the transmission as shown in FIGS. 2A and 2B and functions to regulate line pressure in relation to vehicle operating conditions. In operation ATF at line pressure from the hydraulic pump 208 is delivered via pump outlet circuit 212 to the pressure regulator valve 200. When line pressure guilds to the level of 60 to 75 pounds per square inch (psi), the OEM pressure regulator valve 200 opens routing ATF into the torque converter charge circuit as at 215. To prevent excess line pressure, a portion of the pump's output is diverted to exhaust via the sump return circuit as at 214. Converter charge circuit fluid is routed via switch valve 219 to both the torque converter 216, cooler fluid circuit 217, and into the lubrication circuit 220 (FIG. 1) depending on vehicle operating conditions.

As shown in FIGS. 2A and 2B, the OEM pressure regulator valve 200 comprises a spool valve including a cylindrical piston, indicated generally at 210, having plurality of control diameters or spools 221–225, a compression spring 202, and an end plug 204 arranged coaxially within the valve body 201 shown in partial section.

In operation the force of the spring 202 acting on the piston 210 keeps the pressure regulator valve 200 substantially closed at low engine speed as shown in FIG. 2A. As engine speed increases and line pressure increases, the force of spring 202 is overcome by line pressure reacting on spool 225 and the piston 210 is stroked to the position shown in FIG. 2B to open the converter charge circuit 215 to feed line pressure to the torque converter 216 and cooler fluid circuit 217 (FIG. 1).

When the engine is turned off ATF contained within the torque converter 216 during operation gradually drains back to the sump 211. Thereafter, at initial engine start up this can result in an insufficient ATF level within the torque converter 216 to drive the vehicle because when the transmission is in Park or the engine is idling, the pressure regulator valve 200 will be nearly closed. Thus, the converter charge circuit 215, which delivers ATF to the torque converter 216 does not receive sufficient line pressure to refill the torque converter 216 until the pressure regulator valve 200 opens at approximately 60 (psi) to send line pressure from the pump output circuit into the converter charge circuit 215.

This problem is particularly evident in the Chrysler transmissions when the vehicle is not driven for a period of a few days or more and all the ATF in the torque converter 216 has drained back to the sump 211. Thus, the present invention has been developed to provide a Lube Regulated Pressure Regulator Valve to correct this problem and will now be described.

Figure 3:
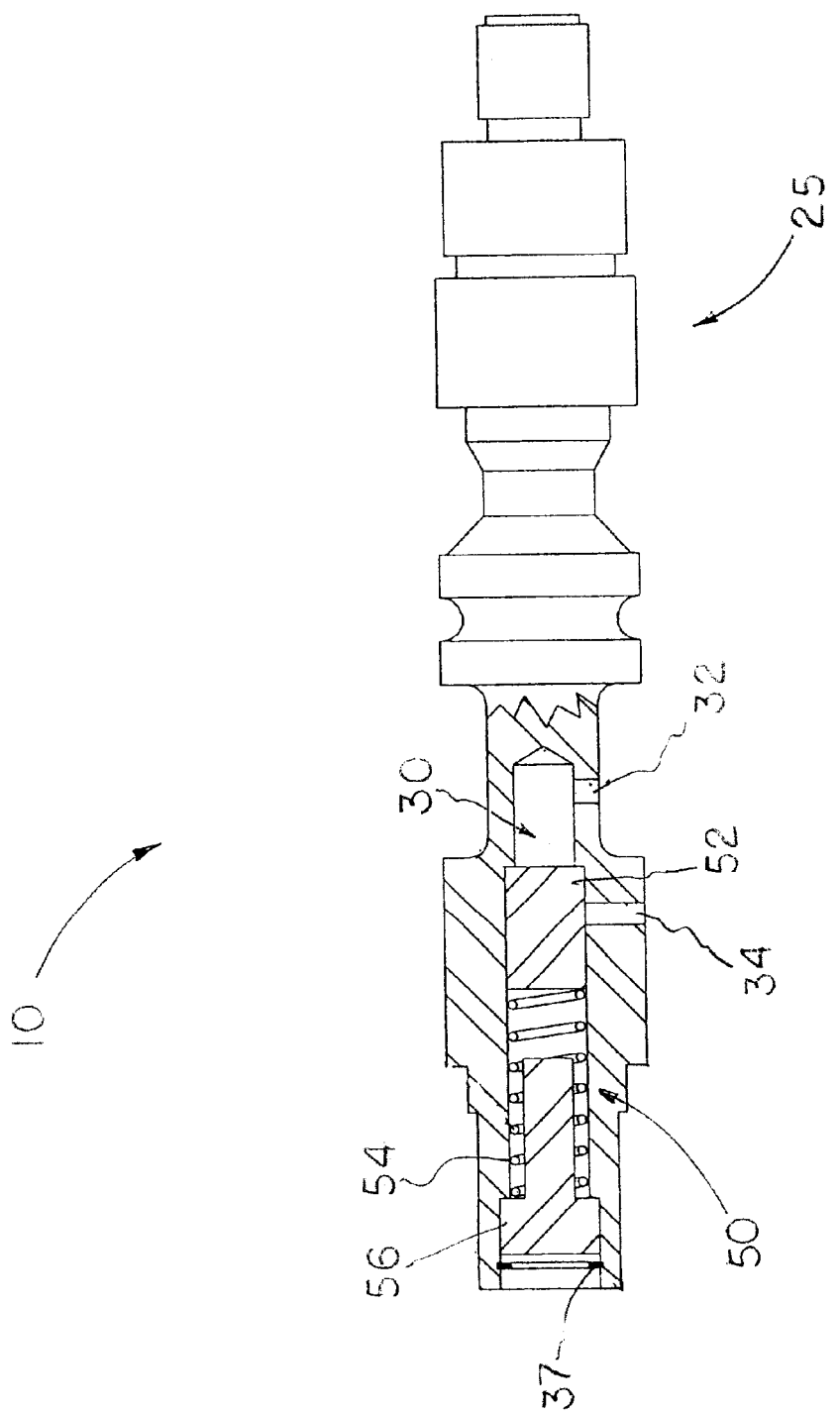
FIG. 3 is a partial sectional view of the Lube Regulated Pressure Regulator Valve of the present invention showing the components thereof.

Referring now to FIG. 3 there is shown therein a Lube Regulated Pressure Regulator Valve in accordance with the present invention, indicated generally at 10, including a Lube Regulated piston, indicated generally at 25, wherein the external configuration remains substantially unchanged from that of the OEM valve piston 210.

However, in the present invention the OEM valve piston 210 has been redesigned to provide the present Lube Regulated piston 25 including an inner valve chamber 30 wherein an internal check valve, indicated generally at 50, is installed. The internal check valve 50 functions to pass ATF at line pressure to the torque converter charge circuit 215 in the Park gear range or at engine idle speed as hereinafter explained in further detail.

As shown in FIG. 3 the present invention provides structures comprising bypassing means including, but not limited to, the structures shown for effectively bypassing the OEM pressure regulator when it is shut off at low engine idle speed. Such bypassing means include an internal check valve 50 comprised of a dowel pin 52, a calibrated spring 54, and a spring guide 56 arranged coaxially in the bore 30 and secured in place by a retaining clip 37.

In one embodiment, among others, dowel pin 52 is fabricated of hardened, alloy steel to predetermined dimensions and provides a slip fit within the valve chamber 30 wherein it resides. Spring 54 has a low spring rate designed to fully open the check valve 50 at a fluid pressure in the range of 1 to 5 pounds per square inch (psi).

Figure 4A:
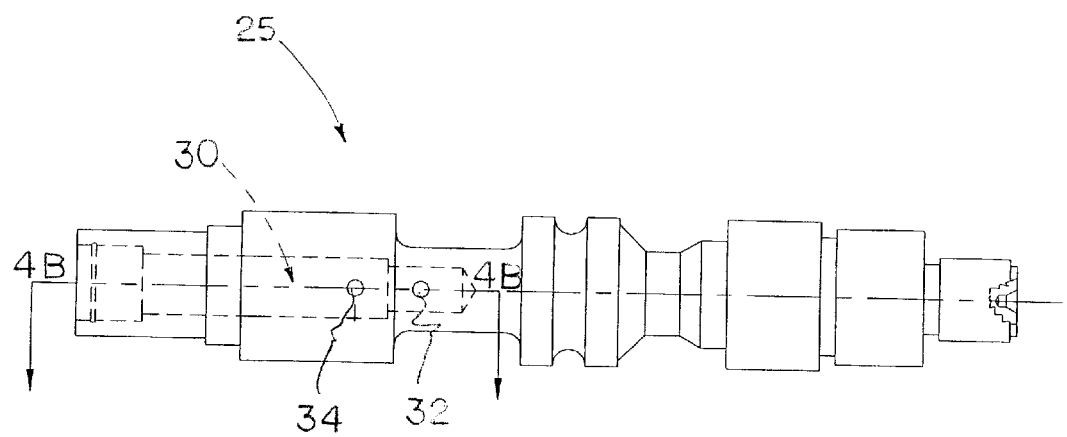
FIG. 4A is an elevational view of the modified valve piston of the present invention.
Figure 4B:
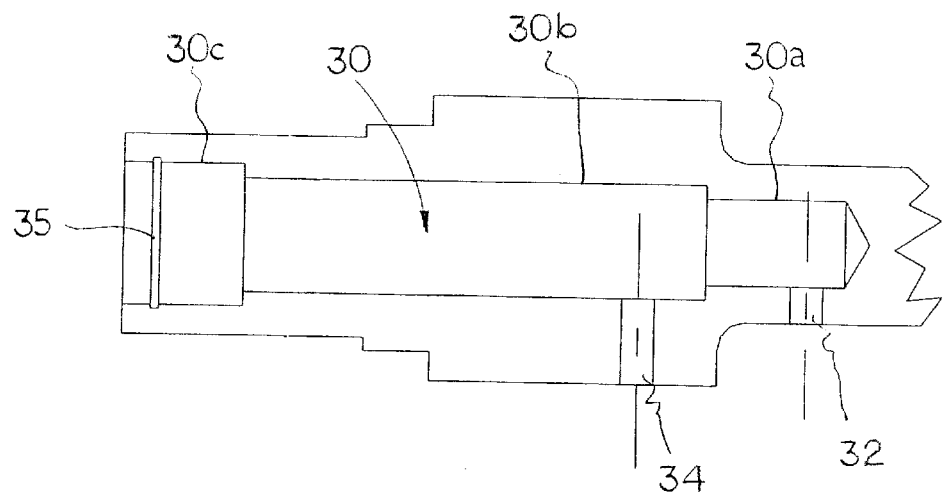
FIG. 4B is a partial sectional view taken along the section line 4B—4B of FIG. 4A showing further details of the present valve piston.

As more clearly shown in FIGS. 4A and 4B, it can be seen that valve chamber 30 includes at least two orifices 32, 34 formed in fluid communication therewith and extending radially outward to the exterior surface of the piston 25. Valve chamber 30 is configured in sections of increasing diameter including a secondary bore 30a, a primary bore 30b, and a counterbore 30c having a retaining clip groove 35 formed therein, which receives the retaining clip 37 (FIG. 3) to secure the present internal check valve 50 in its functional position.

In one manufacturing method of the present invention, among others, the original equipment manufacture (OEM) pressure regulator valve piston 210 is modified to produce the present pressure regulator valve 10. It will be appreciated by those skilled in the art that the valve chamber 30 as most clearly shown in FIGS. 4A and 4B including secondary bore 30a, primary bore 30b, counterbore 30c, retaining clip groove 35, and orifices 32, 34 are machined into the OEM valve piston 210. Thereafter, the dowel pin 52, spring 54, and spring guide 56 are arranged coaxially within the valve chamber 30 and retained in position by retaining clip 37 to complete the conversion to the present Lube Regulated Pressure Regulator Valve 10 (FIG. 3).

Figure 5A:
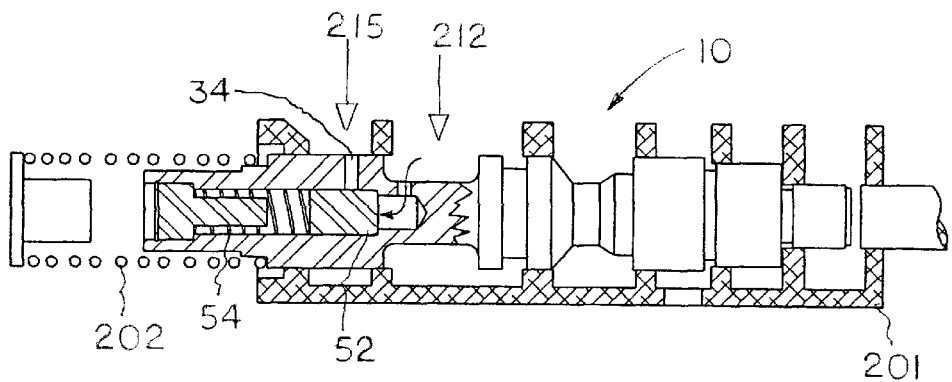
FIG. 5A is a diagrammatic view of the present Lube Regulated Pressure Regulator Valve in a closed position within the valve body and showing the internal check valve in a closed position.
Figure 5B:
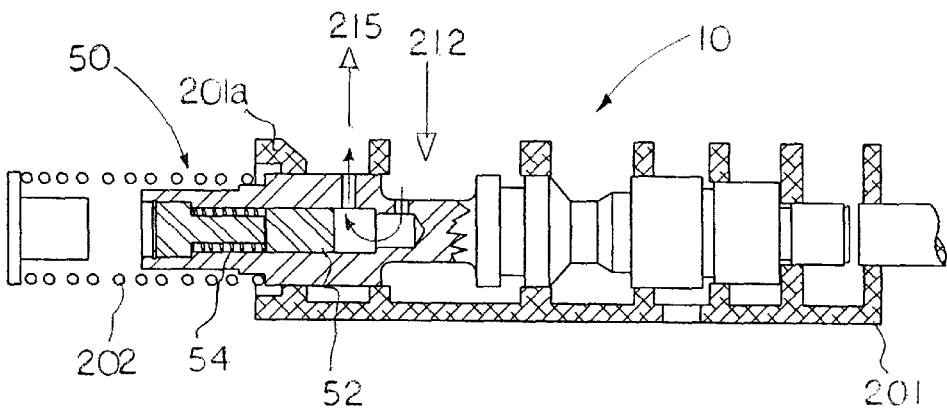
FIG. 5B is a diagrammatic view of the present Lube Regulated Pressure Regulator Valve in a closed position within the valve body and showing the internal check valve in an open position.
Figure 5C:
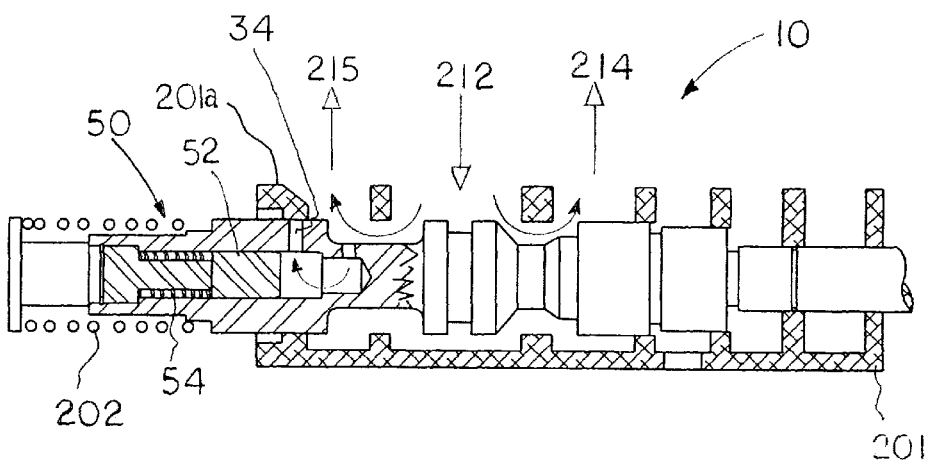
FIG. 5C is a diagrammatic view of the present Lube Regulator Pressure Regulator in an open position within the valve body and showing the internal check valve in a secondary closed position.

FIGS. 5A–5C illustrate the range of operating positions of the present Lube Regulated Pressure Regulator valve 10 including the internal check valve 50 within the valve body 201 in relation to vehicle conditions and/or engine speeds. FIG. 5A shows the present valve 10 when the vehicle engine is shut off. In this position it will be noted that the valve 10 is in a closed position within the valve body 201 and that internal check valve 50 is also in a closed position wherein dowel pin 52 is spring-biased in closing relation to the orifice 34, which prevents ATF within the torque converter charge circuit 215 from draining back through the valve 10 to the sump.

FIG. 5B shows the present valve 10 at initial engine startup and/or low engine speed. In this position it will be noted that the present valve 10 is still in a closed position within the valve body 201 because line pressure has not built up sufficiently to overcome the force of OEM spring 202, but the internal check valve 50 is in an open position and dowel pin 52 has been stroked (i.e. to the left in the drawing) against the lesser force of spring 54 permitting the flow of ATF in Park gear or at low engine speed to pass through the orifices 32, 34 into the torque converter charge circuit as at 215. Thus, ATF flows to the torque converter 216 at engine idle in an amount sufficient to permit instantaneous operation of the vehicle at startup.

FIG. 5C shows the present valve 10 at high engine speed. In this position it will be noted that the pressure regulator valve 10 is in an open position and internal check valve 50 is shut down as orifice 34 has moved into closing relation with an adjacent land 201a in the valve body. At high speed some ATF is diverted to exhaust via the sump return circuit 214 to maintain line pressure in the torque converter charge circuit 215, cooler circuit 217 and lube circuit 220 below a factory specified level for the transmission.

Thus, it can be seen that the present Lube Regulated Pressure Regulator Valve is a direct replacement for the OEM pressure regulator valve, which includes an internal check valve that provides increased ATF flow into the torque converter charge circuit at initial engine startup. After sufficient line pressure in built up and the present pressure regulator valve opens to feed line pressure to the torque converter charge circuit directly, the internal check valve is closed and the present valve operates in accordance with factory specifications duplicating all of the functions of the OEM valve. When the engine is shut off, the present internal check valve also prevents ATF from draining back from the torque converter through the pressure regulator valve eliminating the converter drain back problem described hereinabove.

Although not specifically illustrated in the drawings, it should be understood that additional equipment and structural components will be provided as necessary and that all of the components described above are arranged and supported in an appropriate fashion to form a complete and operative Lube Regulated Pressure Regulator Valve incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An improved pressure regulator valve for an automotive transmission having a hydraulic pump, said pressure regulator valve including a valve piston having plurality of control diameters formed thereon for regulating the flow of automatic transmission fluid from the hydraulic pump through a torque converter charge circuit to a torque converter of said transmission responsive to pump operating speeds, wherein the improvement comprises:
an internal check valve integrated within said valve piston, said internal check valve being disposed in fluid communication with the hydraulic pump and the torque converter, said internal check valve opening at low pump speeds in response to lower pressure than is required to open the pressure regulator valve in its factory specified operating range.

2. An improved pressure regulator valve of claim 1 wherein said internal check valve opens responsive to fluid pressure in the range of 1 to 5 pounds per square inch.

3. An improved pressure regulator valve of claim 2 wherein said factory specified operating range of said pressure regulator valve is 60 to 75 pounds per square inch.

4. An improved pressure regulator valve of claim 1 wherein said internal check valve also functions to prevent drainage of hydraulic fluid from the torque converter when the pump is not operating.

5. An improved pressure regulator valve of claim 4 wherein said internal check valve includes a cylindrical dowel pin disposed within a valve chamber formed in said pressure regulator valve, said dowel pin being biased to closed position by a compression spring.

6. An improved pressure regulator valve of claim 1 wherein line pressure is passed through said internal check valve from the hydraulic pump in an amount sufficient to fill the torque converter when the transmission is in the Park gear range.

7. In an automatic transmission of a motor vehicle, a pressure regulator valve disposed within the valve body of the transmission in fluid communication with a hydraulic pump via a pump outlet circuit on an inlet side thereof and a torque converter via a torque converter charge circuit on an outlet side thereof, wherein the improvement comprises:
an internal check valve integrated within said pressure regulator valve and positioned in fluid communication with the pump outlet circuit and the torque converter charge circuit such that hydraulic fluid is passed through said check valve in response to less pressure than is required to open said pressure regulator valve in its factory specified operating range.

8. The automatic transmission of claim 7 wherein said internal check valve is opened by hydraulic pressure in the range of 1 to 5 pounds per square inch.

9. The automatic transmission of claim 8 wherein said specified operating range of said pressure regulator valve is 60 to 75 pounds per square inch.

10. The automatic transmission of claim 7 wherein said internal check valve also functions to block the drainage of hydraulic fluid from said torque converter when the hydraulic pump is not operating.

11. The automatic transmission of claim 10 wherein said internal check valve includes a cylindrical dowel pin disposed within a valve chamber formed within said pressure regulator valve, said dowel pin being biased to a closed position in relation to the pump outlet circuit by a compression spring.

12. A pressure regulator valve assembly for an automotive transmission having a hydraulic pump disposed in fluid communication with a torque converter via a torque converter charge circuit, said pressure regulator valve comprising:
a valve piston having a plurality of concentric control diameters formed thereon for regulating the flow of automatic transmission fluid from the hydraulic pump to the torque converter;
a compression spring arranged in coaxial relation to said valve piston, said compression spring biasing said valve piston to a closed position in relation to said torque converter charge circuit; and
bypassing means integrated within said valve piston such that said bypassing means releases hydraulic fluid to the torque converter in response to less hydraulic pressure than is required to open said valve piston against the force of said compression spring.

13. A pressure regulator valve assembly of claim 12 wherein said bypassing means comprises an internal check valve installed within said valve piston, said internal check valve being disposed in fluid communication with the hydraulic pump and the torque converter charge circuit such that hydraulic fluid is passed through said internal check valve to the torque converter when the transmission is in a Park gear range.

14. A pressure regulator valve assembly of claim 12 wherein said internal check valve is opened by hydraulic pressure in the range of 1 to 5 pounds per square inch.

15. A pressure regulator valve assembly of claim 14 wherein the force of said compression spring is 60 to 75 pounds per square inch.

16. The pressure regulator valve assembly of claim 13 wherein said internal check valve also functions to prevent the drainage of hydraulic fluid from the torque converter when the hydraulic pump is not operating.

17. The pressure regulator valve assembly of claim 16 wherein said internal check valve includes a cylindrical dowel pin disposed within a valve chamber formed within said valve piston, said dowel pin being spring-biased to a closed position in relation to said torque converter charge circuit.

18. A method for continuously filling a torque converter in an automatic transmission of a motor vehicle operating at low engine speed, wherein the transmission includes a hydraulic pump, a torque converter, and a pressure regulator valve disposed in the valve body of the transmission in fluid communication with the hydraulic pump via a pump output circuit and the torque converter via a torque converter charge circuit, said pressure regulator valve functioning to regulate the flow of automatic transmission fluid from the hydraulic pump to the torque converter responsive to pump operating speed, said method comprising the steps of:

providing a replacement pressure regulator valve including an internal check valve;

positioning said replacement pressure regulator valve within said valve body such that said internal check valve is disposed in fluid communication with a pump output circuit and the torque converter charge circuit;

opening said internal check valve at low engine speed such that transmission fluid is released to said torque converter via said torque converter charge circuit in response to less hydraulic pressure than is required to open said pressure regulator valve in its factory specified operating range; and closing said internal check valve at high engine speed when said pressure regulator valve opens in said factory specified operating range.

19. The method of claim 18 wherein the step of providing further includes the steps of:

machining a cylindrical valve chamber in the original equipment manufacture pressure regulator valve piston along the longitudinal axis thereof;

drilling at least one pump outlet orifice and at least one torque converter charge circuit orifice in said valve piston each extending radially from said valve chamber at predetermined axial locations in fluid communication with the pump output circuit and the torque converter charge circuit; and installing said internal check valve into said valve chamber such that said internal check valve is biased to a closed position in relation to said torque converter charge circuit.

20. The method of claim 19 wherein the step of installing further includes the steps of:

inserting a dowel pin into said valve chamber in closing relation to the torque converter charge circuit orifice;

positioning a compression spring adjacent to said dowel pin;

compressing said spring intermediate said dowel pin and a spring guide disposed adjacent said spring; and capturing said dowel pin, said spring, and said spring guide within said valve chamber with a retaining clip.

* * * * *